March 14, 1933. W. L. CLOUSE 1,901,146
DELIVERY MECHANISM FOR NUT TAPPERS
Filed Feb. 26, 1932 4 Sheets-Sheet 1

W. L. Clouse Inventor

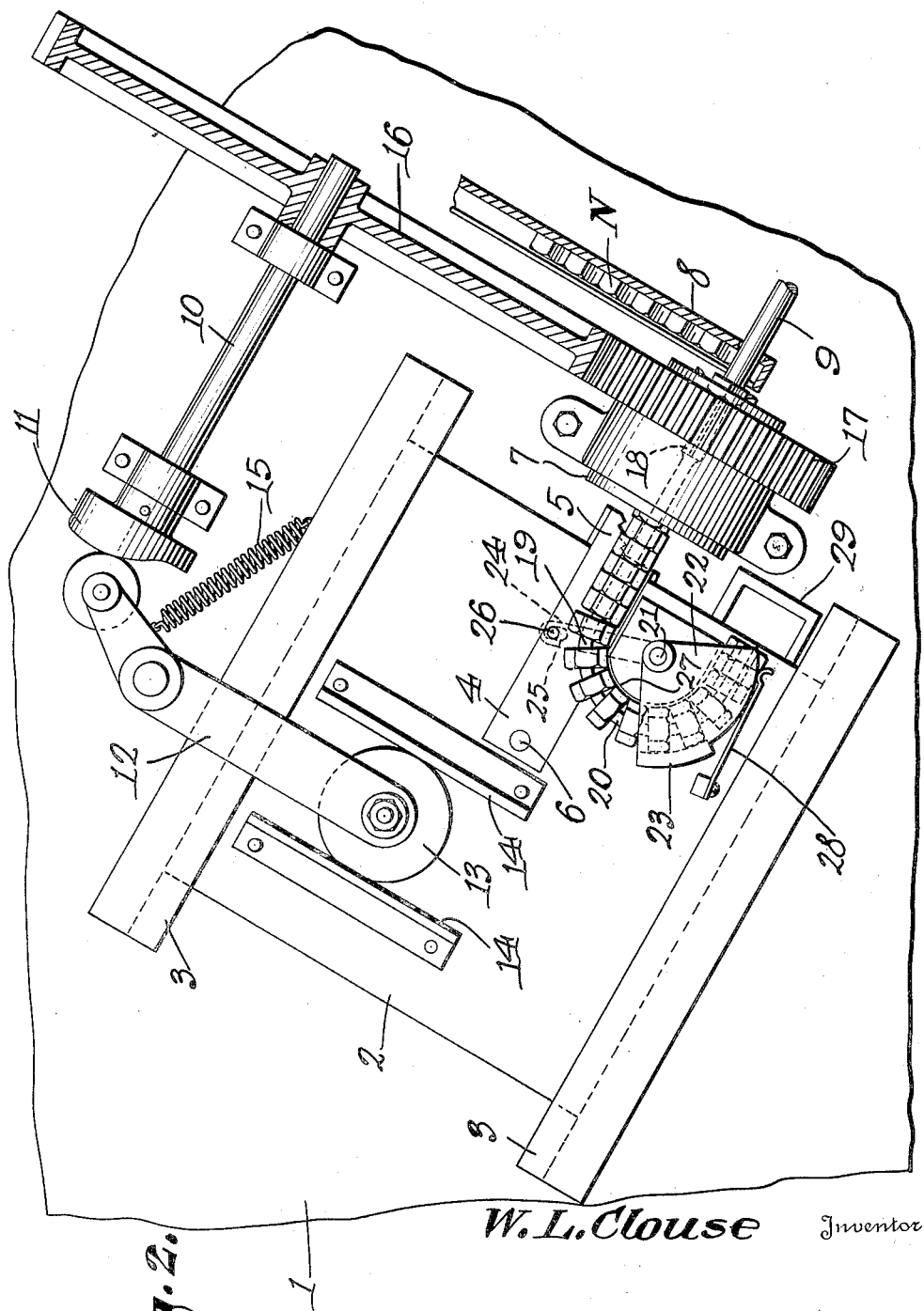

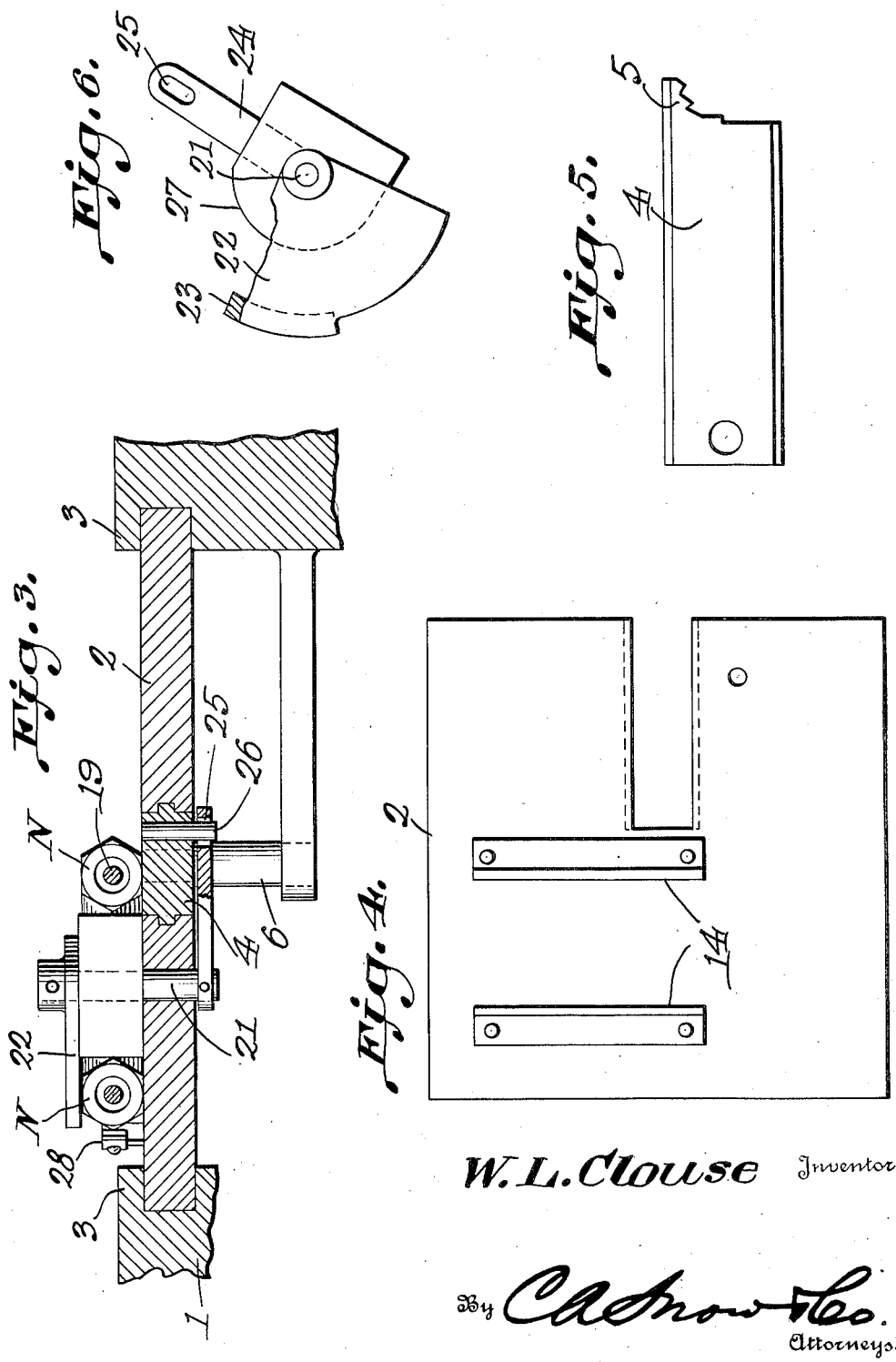

March 14, 1933.  W. L. CLOUSE  1,901,146
DELIVERY MECHANISM FOR NUT TAPPERS
Filed Feb. 26, 1932  4 Sheets-Sheet 4

W. L. Clouse Inventor
By C. A. Snow & Co.
Attorneys.

Patented Mar. 14, 1933

1,901,146

UNITED STATES PATENT OFFICE

WILLIAM L. CLOUSE, OF TIFFIN, OHIO, ASSIGNOR TO THE NATIONAL MACHINERY COMPANY, OF TIFFIN, OHIO

DELIVERY MECHANISM FOR NUT TAPPERS

Application filed February 26, 1932. Serial No. 595,358.

This invention relates to a nut tapping machine and more especially to means for delivering the threaded nuts from the stem of the tap.

In tapping machines heretofore devised the threaded nuts have been forced back upon the curved stem of the tap and the resistance to the sliding movement of the nuts due to friction and inertia, has tended to crowd the nuts as they leave the head of the tap. This has resulted frequently in mutilation of the end of the thread in each finished nut. In an effort to eliminate this objectionable result various means have been adopted without properly meeting the requirements.

One of the objects of the present invention is to mount the tap for reciprocation longitudinally of a stationary member whereby, through frictional contact with said member, a drag upon the nuts on the tap stem will be set up during each advance of the tap, thereby tending to hold back the nuts and prevent crowding at the tap head.

A further object is to provide a movably mounted thrust receiving member operating in properly timed relation to draw the threaded nuts along the curved portion of the tap stem while they are being thrust backwardly by the receding tap as the threading of a nut is completed.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings:

Figure 2 is a similar view showing the parts at their other extreme positions.

Figure 3 is a section on line 3—3, Figure 1.

Figure 4 is a face view of one form of reciprocating slide which can be used.

Figure 5 is a plan view of a combined placer and drag strip.

Figure 6 is a plan view, broken away, of the oscillating delivery element.

Figure 1:
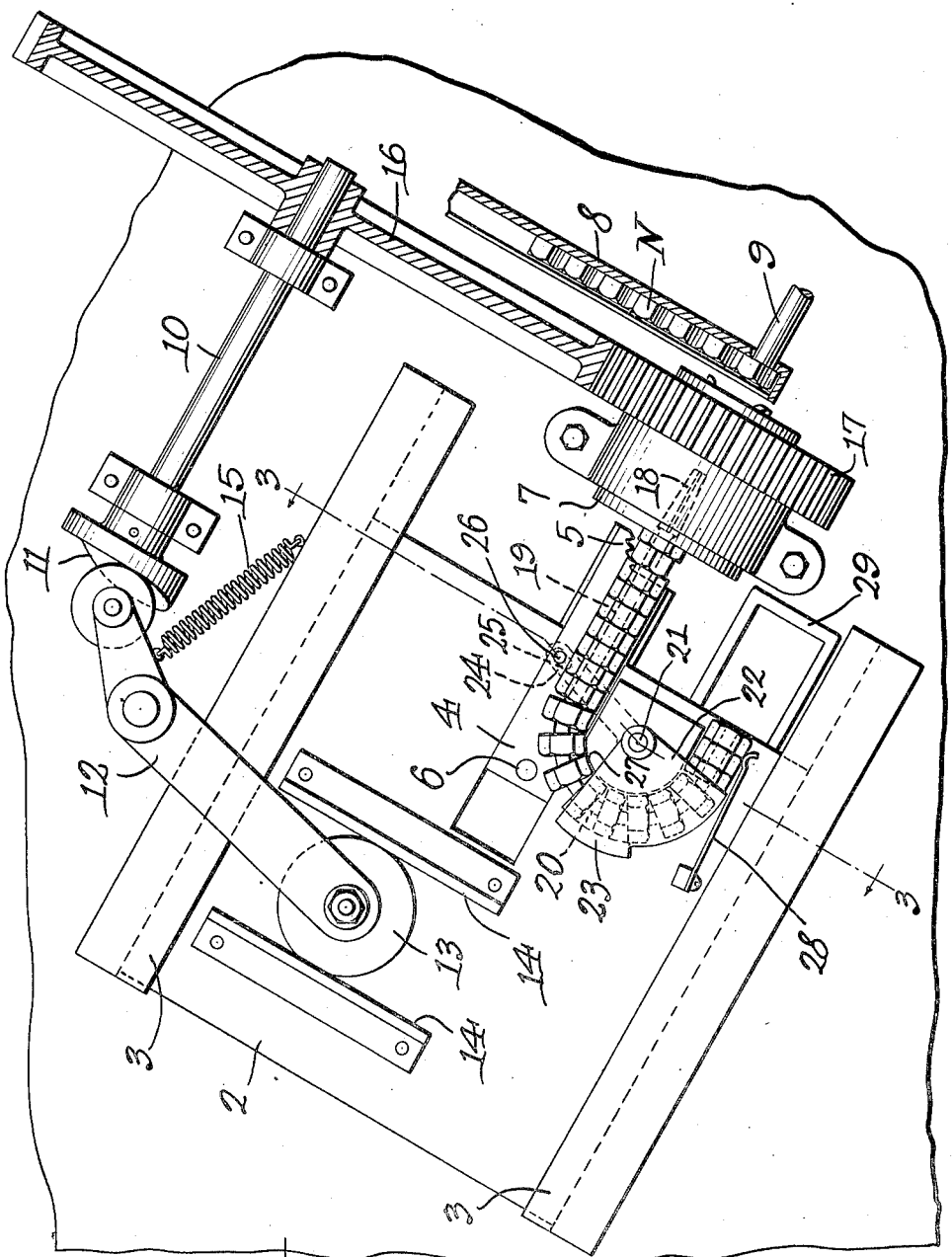
Figure 1 is a view more or less in diagram of a portion of the machine showing the tap and associated mechanism in retracted position.

Referring to the figures by characters of reference, 1 designates a portion of the frame of a tapping machine and mounted for reciprocation relative thereto is a slide 2 of suitable proportions supported by guides 3 of any construction desired. A strip 4 is arranged parallel with the path of movement of the slide and has one end projecting beyond the slide and stepped to form a placer 5. This strip is fixedly mounted, as on a post 6.

A tubular nut holder 7 is mounted for rotation between the placer 5 and a feed chute 8 and a feed plunger 9 is adapted to direct nut blanks N one at a time from said chute into the rotating holder 7.

A shaft 10, adapted to be driven by any suitable means, is provided with a cam 11 for actuating a lever 12. A roller 13 can be located at one end of the lever for rolling engagement with a member 14 on slide 2 and a spring 15 can be employed for holding the lever in working relation with the cam. This spring acts through the lever 12 to pull the slide back from the holder 7 when such movement is permitted by the cam. A gear 16 can rotate with shaft 10 and meshes with a gear 17 on holder 7, so that said holder will be rotated at the required speed. The cam 11 and spring 15 operate to advance and retract the slide at predetermined speeds and time intervals.

A tap 18 is extended into holder 7 and has a stem 19 which overlies and extends longitudinally of strip 4, the back end portion of the stem being bent laterally into substantially semi-circular form as at 20. This bent portion is concentric with a stub shaft 21 journaled in slide 2 and provided at its upper end with a segment 22 which overlies the tap stem. Depending from this segment is an arcuate wing 23 concentric with the bent portion 20 of the stem and spaced therefrom a sufficient distance to receive thrust from the adjacent nuts on the stem when pushed backwardly with the stem.

An arm 24 is extended radially from the lower end of shaft 21 and has a slotted end 25 pivotally and slidably engaging a fixed pin 26 which can be carried by the stationary strip 4.

An arcuate guide surface 27 can be located between shaft 21 and the bent portion 20 of the tap stem so that when said portion is positioned under segment 22 the tap will be caused to advance and retract with the slide 2.

A spring strip 28 is secured to the slide and bears lightly against the nuts on the tap stem adjacent to the point of discharge and acts to prevent the nuts from being delivered from the machine too freely and out of control.

When the tap 18 is in its rearmost position in holder 7 the slide 2 is also at the limit of its backward movement. Thus the parts are positioned as in Figure 1. Plunger 9 is advanced as in said figure to force a blank N into holder 7 and during the last portion of this movement the cam 11 acts to move the slide 2 and the tap forwardly so that the head of the tap will be pressed against and into the rotating blank. Plunger 9 is then reset and the slide and tap, which have reached the positions shown in Figure 2, begin to recede until they return to the positions illustrated in Figure 1 at which time the threading of the blank has been completed and the nut has passed off the tap head and onto stem 19, where it is held against forward movement with the tap by any suitable means such as shown, for example, in my co-pending application covering a double placer.

Assuming that tap stem 19 and its curved portion 20 are filled with a series of threaded nuts as shown it will be apparent that, during the advance of the slide and tap, and pressure of the tap against a new blank, those nuts supported on strip 4 will frictionally engage said strip and the drag set up will tend to hold back the nuts and relieve the tap head from much of the resistance otherwise offered by the threaded nuts to the movement of a newly threaded nut onto the tap stem. At the same time the thrust transmitted to the nuts on the stem from each newly threaded nut as it passes onto the stem from the tap head is received at the arcuate wing 23 as the slide advances, and while certain of the nuts are thus being pressed back against the wing, said wing is swung laterally from the position shown in Figure 1 to the position shown in Figure 2, thereby acting to draw some of the nuts along the curved portion 20 of the stem and against and past the retaining spring 28 so that they can drop one at a time from the end of the stem into a chute 29 or the like provided therefor.

As the slide and tap move back to their first positions, as in Figure 1, the wing 23, being relieved from thrust, swings freely past the adjacent nuts to its initial position.

Figure 7:
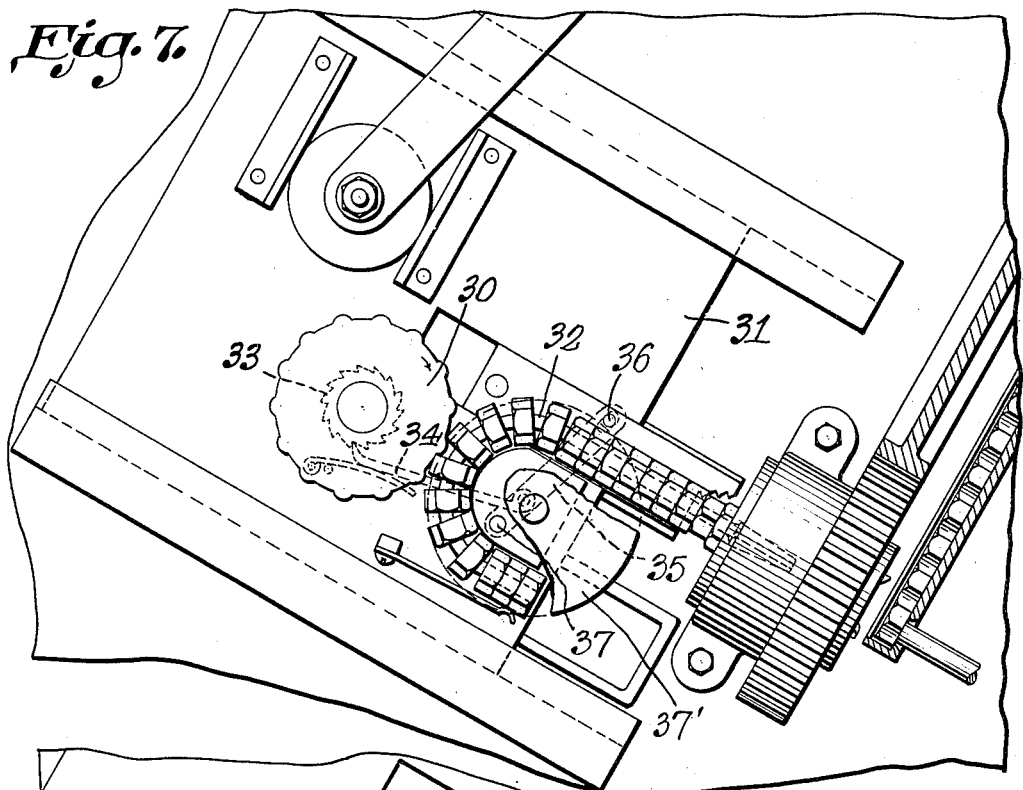
Figure 7 is a view similar to Figure 1 showing a rotatable delivery element for engagement with the nuts on the tap stem.

While the thrust-receiving element 23, heretofore described, is mounted for oscillation, it is to be understood that it might be desirable to use a rotatable thrust-receiving element in lieu thereof. For example, and as shown in Figure 7, a wheel 30 can be mounted for rotation on slide 31 with its periphery positioned where it will engage those nuts at the center of the bent portion of the stem 32 of the tap.

A ratchet 33 can be rotatable with the wheel and can be operated by a pawl 34 connected to a lever 35. This lever can be anchored at one end as shown at 36 while its other end can be pivotally connected at 37 to the slide 31. Thus as the slide advances to feed the top into a black the pawl 34 will rotate wheel 30 and cause it to push a nut from the stem at the delivery and thereof. A disk 37' can be mounted for rotation above the tap so as to prevent the end of the tap from rising.

Figure 8:
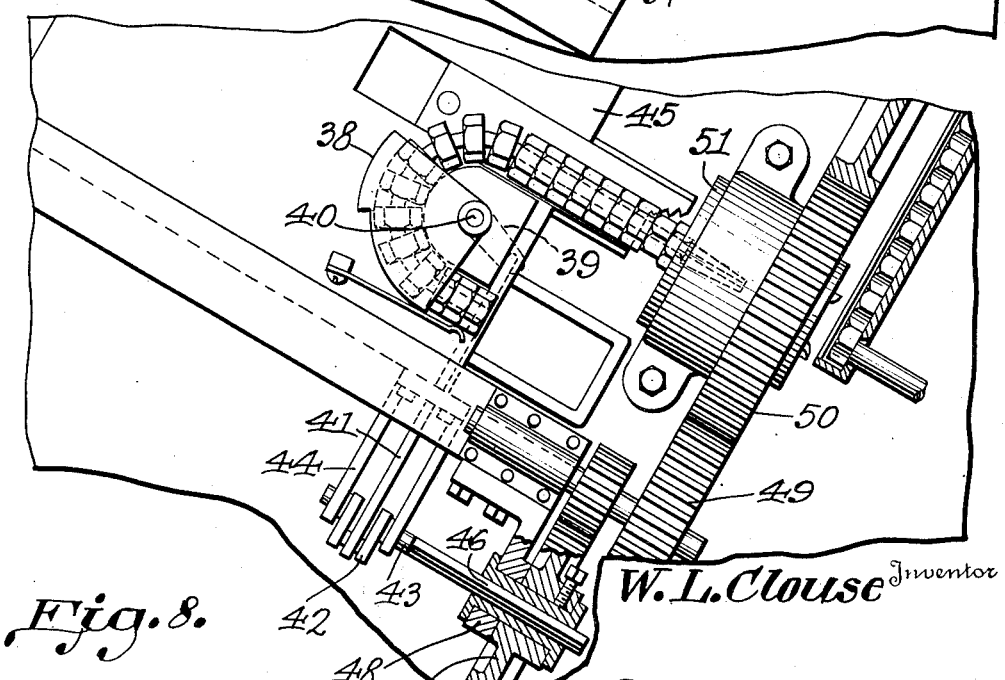
Figure 8 is a view similar to Figure 7 showing a modified means for operating an oscillating thrust-receiving element.

Another modification of the apparatus has been illustrated in Figure 8. In this structure there is provided an oscillating thrust-receiving element 38 similar to the one illustrated in Figure 1. However, instead of operating this element by the reciprocation of slide 31 it can be operated independently of the movement of the slide. For example, a crank arm 39 can be extended from the shaft 40 of the oscillating element, this arm being connected by a rod 41 to the crank 42 of a shaft 43. The shaft is journaled in bracket 44 which extends from and reciprocates with the slide 45. One end portion of the shaft is squared or otherwise shaped, as at 46, so as to slide within a gear 47 journaled in a stationary bearing 48. Speed reducing gearing 49 can be employed for transmitting motion to gear 47 from the gear 50 on holder 51. Obviously with this arrangement continuous rotation will be imparted to shaft 43 as it reciprocates with slide 45 and within gear 47. Consequently the thrust-receiving element 38 will oscillate in properly timed relation with the reciprocation of the slide 45, although operated independently of the slide.

What is claimed is:

1. A nut tapping machine including a tap mounted for reciprocation having a stem with an arcuate portion, and a thrust receiving device mounted for oscillation relative to and concentric with said arcuate portion.

2. A nut tapping machine including a tap mounted for reciprocation having a stem with a laterally extended portion, a device for receiving thrust from nuts on the said portion of the stem, and means for shifting said device while subjected to pressure from said nuts to move the nuts along the stem.

3. A nut tapping machine including a tap mounted for reciprocation having a stem with a laterally extended portion, a device for receiving thrust from nuts on the said portion of the stem, and means for oscillating said device relative to and parallel with the stem while subjected to pressure from said nuts to move the nuts along the stem.

4. A nut tapping machine including a tap mounted for reciprocation, having a stem with an arcuate portion, a device for receiving thrust from nuts on the arcute portion of the stem, and means for oscillating said device while subjected to pressure from said nuts to move the nuts along the stem.

5. A nut tapping machine including a tap mounted for reciprocation, having a stem with an arcuate portion, a device for receiving thrust from nuts on the arcuate portion of the stem, and means for oscillating said device relative to and concentric with the arcuate portion to move the engaged nuts intermittently along the stem toward the delivery end thereof.

6. A nut tapping machine including a tap mounted for reciprocation having a stem with a laterally extending portion, a device for receiving thrust from nuts on said portion of the stem, and means operated by the reciprocation of the tap for shifting said device while subjected to pressure from said nuts to move the nuts along the stem.

7. A nut tapping machine including a tap mounted for reciprocation, having a stem with an arcuate portion, a device for receiving thrust from nuts on the arcuate portion of the stem, and means operated by the reciprocation of the tap for oscillating said device while subjected to pressure from said nuts to move the nuts intermittently along the stem.

8. A nut tapping machine including a rotatable nut holder, a fixed placer strip extended toward the holder, a tap extending into the holder and having a stem for guiding nuts along said strip after leaving the holder, and means for reciprocating the tap relative to the strip.

9. A nut tapping machine including a stationary strip, a placer at one end thereof, a rotatable nut holder in line with the placer and strip, a slide, a tap carried thereby and projecting into the holder, said tap having a stem for guiding threaded nuts from the holder past the placer and into sliding engagement with the strip, and means for reciprocating the slide and tap relative to the strip.

10. A nut tapping machine including a stationary strip, a placer at one end thereof, a rotatable nut holder in line with the placer and strip, a slide, a tap carried thereby and projecting into the holder, said tap having a stem for guiding threaded nuts from the holder past the placer, and into sliding engagement with the strip, a device for receiving thrust from nuts on the stem when pushed along the stem, means for reciprocating the slide and tap relative to the strip, and means operated by the reciprocation of the slide for shifting said device while subjected to pressure from the adjacent nuts to move said nuts along the stem.

11. A nut tapping machine including a stationary strip, a placer at one end thereof, a rotatable nut holder in line with the placer and strip, a slide, a tap carried thereby and projecting into the holder, said tap having a stem for guiding threaded nuts from the holder past the placer and into sliding engagement with the strip, one end portion of the stem being arcuate, a device mounted for oscillation relative to and concentric with said arcuate portion, for receiving thrust from nuts on the arcuate portion, and means operated by the reciprocation of the tap for oscillating said device while subjected to thrust from said nuts.

12. A nut tapping machine including a nut holder rotatably mounted, a tap extending thereinto and mounted for reciprocation, said tap having a stem with an arcuate portion, and means movable with the tap and oscillated by said movement, for receiving thrusts from nuts on said arcuate portion and sliding them therealong toward one end of the stem.

13. A nut tapping machine including a tap having a stem with a straight portion and an arcuate portion, separate fixed and movable means for frictional engagement with nuts on the straight and arcuate portions respectively, means for advancing the straight portion of the stem relative to the nuts engaged by the stationary means, and means operated by said advance movement of the stem for actuating the movable nut engaging means to shift its engaged nuts along the arcuate portion of the stem.

14. A nut tapping machine including a tap mounted for reciprocation having a stem with an arcuate portion, a thrust-receiving device movable with the stem, and means for moving said device relative to the stem for shifting nuts along the stem.

15. A nut tapping machine including a tap mounted for reciprocation and having a stem with an arcuate portion, a device for receiving thrust from nuts on the arcuate portion during the movement of the tap in one direction, and means for moving said device to feed along the arcuate portion those nuts thrust against the device.

16. A nut tapping machine including a tap mounted for reciprocation and having a stem with an arcuate portion, a device for receiving thrust from nuts on said arcuate portion during the movement of the tap in one direction, said device being mounted for movement about an axis substantially fixed relative to the stem, and means for moving said device about its axis while receiving thrust from the nuts to shift the engaged nuts along the stem.

In testimony that I claim the foregoing as my own, I have hereto affixed my signature.

WILLIAM L. CLOUSE.